United States Patent [19]

Gros

[11] 3,789,512
[45] *Feb. 5, 1974

[54] PLUMB BOB DEVICE WITH SPOOL MEANS FOR TETHERING LINES

[76] Inventor: Wilfred T. Gros, Rt. 12, Box 565, Houston, Tex. 77040

[ * ] Notice: The portion of the term of this patent subsequent to Aug. 15, 1989, has been disclaimed.

[22] Filed: Feb. 7, 1972

[21] Appl. No.: 223,908

[52] U.S. Cl. .................................. 33/393
[51] Int. Cl. ............................. G01c 15/10
[58] Field of Search .................... 33/392, 393

[56] References Cited
UNITED STATES PATENTS
3,683,510  8/1972  Gros .................................. 33/399
3,056,211  10/1962  Soverkrop ........................ 33/393

Primary Examiner—Louis R. Prince
Assistant Examiner—Charles E. Phillips

[57] ABSTRACT

A plumb bob device is suspended on a flexible member in a liquid in a closed container. The container is provided with a centrally positioned, upwardly pointed indicator means for aligning with the plumb bob to indicate a true vertical relationship, and spool means are provided adjacent each end of the container for receiving a flexible line so that the flexible line may be wound on each of the spool means when the plumb bob device is not in use, but may be unwound therefrom to secure the plumb bob device in position for use.

The spools adjacent each end of the container include axially extending shafts with slot means whereby the flexible lines on the spool means may be positioned in the slots to properly position the plumb bob device during use.

2 Claims, 3 Drawing Figures

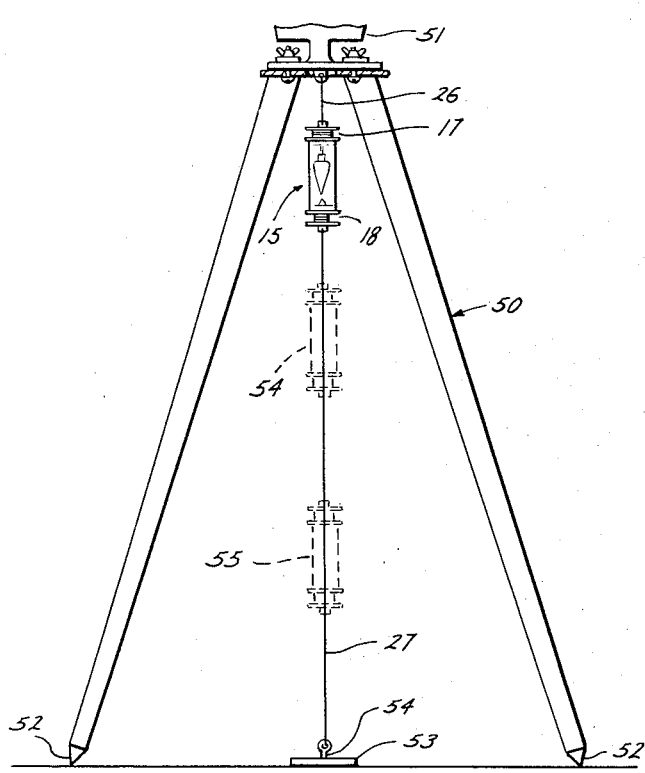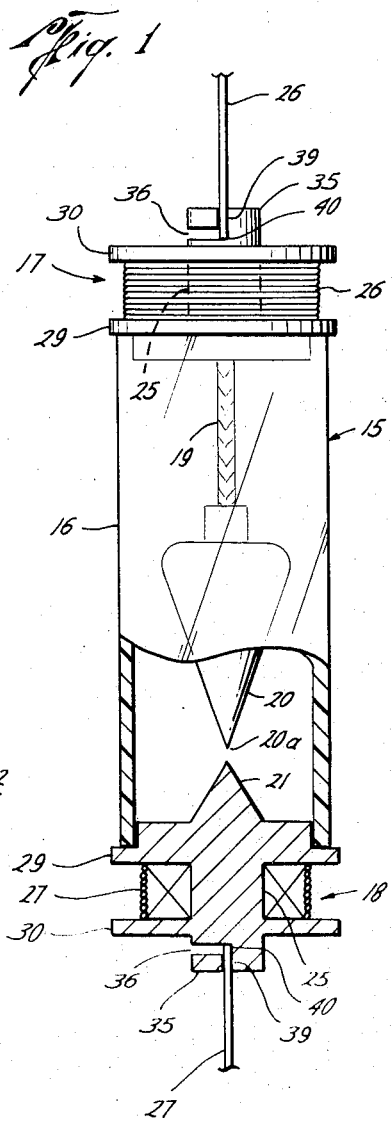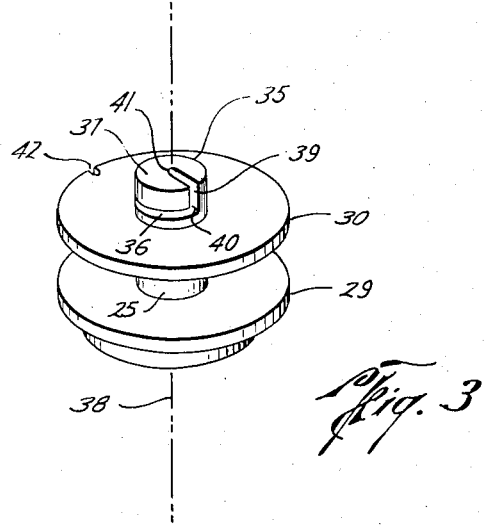

PLUMB BOB DEVICE WITH SPOOL MEANS FOR TETHERING LINES

CROSS-REFERENCE TO RELATED APPLICATIONS

The present invention is an improvement over my co-pending application Ser. No. 85,095 filed Oct. 29, 1970, for Plumb Bob Device.

SUMMARY OF THE INVENTION

Plumb bob devices are utilized in obtaining verticals which are referenced to the center of gravity of the earth as a means of properly erecting buildings, structures, and the like. Of course, other uses are known for vertical lines. Plumb bob devices known in the prior art have entailed the use of a string or other flexible member on which is suspended a weight which has a downwardly directed point at the lower side. In attempting to obtain a vertical therewith, the device is suspended with the flexible member extended, whereupon the plumb bob device tends to oscillate for an extended period of time about the eventual vertical line. On conclusion of the oscillations, the vertical is indicated by the pointer carried on the lower portions of the weight. The line or location then determined is useful in indicating the vertical for the construction of buildings and for the performance of other tasks as will be appreciated.

Plumb bobs are also used to reference a point above a lower point. For instance, in surveying, a tripod may be erected above a stake; and the tripod is used by the surveyor to obtain desired measurements with reference to the stake. Obviously, the tripod cannot be positioned with the surveying instrument immediately above the stake since the usually low elevation of the stake interferes with operation of the tripod and surveying instrument. Thus, plumb bobs have been also used to properly vertically position a surveying instrument with reference to a stake or other point located therebelow wherein the gravity of the earth draws the plumb bob directly towards the stake and, as a consequence, assists in locating a point in vertical alignment thereabove. In any case, the uses and desirability of a straight line at a desired location are known to those skilled in the art.

An object of the present invention is to provide a new and improved plumb bob device utilizing a viscous dampening medium to eliminate the need for waiting out a period of oscillations in initially obtaining a vertical, as well as spool means secured to each end of the container to enable the plumb bob device to be positioned at any desired elevation in relation to a tripod or in relation to any other vertical position wherein the device is to be employed.

Yet a further object of the present invention is to provide a completely liquid damped plumb bob which includes a spool means on each end of the container enclosing the plumb bob for receiving flexible line means thereon so that the flexible line means may be stored when not in use, but may be unwound from the spool and engaged with a shaft extending from each of the spools for positioning th plumb bob in a desired manner for use.

Other objects and advantages of the present invention will become more readily after condisering the following description and drawings wherein:

BRIEF DESCRIPTION OF THE DRAWINGS

FIG. 1 is a plan view of the device of the present invention showing the plumb bob in a container with the spool means at each end of the container and the shaft means on each of the spools with slot means in the shaft means whereby the flexible line may be received on the spool means and unwound therefrom and engaged in the slot means of the shaft means for properly positioning the plumb bob device;

FIG. 2 is a view of a tripod utilizing the structure of the present invention for obtaining a vertical plumb line, and illustrates the device in several vertical positions in relation to the tripod; and FIG. 3 is an isometric view of one of the spools illustrating in greater detail the arrangement of the shaft and slot means in each shaft.

DESCRIPTION OF THE PREFERRED EMBODIMENT

Attention is directed to FIG. 1 wherein the invention is referred to generally by the numeral 15 and is shown as including the hollow cylindrical container 16. The hollow cylindrical container 16 is formed of any suitable material such as plastic so that it is transparent and is closed at each end by a closure including the spool 17 at one and the spool 18 at the other end of the container.

The spool 17 has secured thereto a flexible line 19 which suspends the plumb bob device 20 within the hollow closed container 16 as shown in FIG. 1. The spool 18 at the other end of the container 16 includes a centrally located upwardly projecting pointer 21 for alignment with the plumb bob device 20, which is also shown as having a point 20a on its lower end thereof.

When the plumb bob 20 and the spools 17 and 18 are to be positioned on the container 16, one of the spools 17 may be positioned on the hollow cylindrical housing 16 and then the hollow cylindrical housing 16 filled with liquid and then the other spool fitted in the end of the hollow cylindrical housing 16. The spools 17 and 18 may be secured in position on the hollow cylindrical housing 16 by any suitable means such as an adhesive or the like.

The spool 17 includes the recessed central portion forming a drum 25 and is adapted to receive the flexible line illustrated at 26 wound thereon. Similarly, the spool 18 is provided with a recessed portion 25 for receiving a second flexible line 27 at the other end of the closed, hollow cylindrical container 16.

Reference is directed to FIG. 3 wherein one of the spools is illustrated in greater detail and is shown as including in addition to the central recessed portion 25, the annular spaced flanges 29 and 30 at each end of the drum 25 for receiving the flexible line wound on the central recessed portion or drum 25 between such flanges.

Each of the spools 17 and 18 also includes a shaft 35 projecting axially from the end thereof. Each such shaft includes a first slot 36 intermediate the outer end 37 of the shaft 35 and the outermost flange 30. The slot 36 extends approximately halfway through the shaft 35 at a right angle relative to the longitudinal axis 38 of shaft 35. A second slot 39 intersects the first slot 36 at one end 40 thereof and extends from the end of 40 of the first slot 36 vertically and axially of the shaft 35 as shown in FIG. 3. Also, the second slot 39 extends inwardly of the shaft 35 to the center 41 thereof. A notch 42 is provided on the edge of drum 30 opposite the slot 39 as shown in FIG. 3.

Thus, when the flexible line 26 or the flexible line 27 is unwound from the drum recessed portion 25 of each of the spools 17 and 18, it may be engaged in the notch 42 in the angular flange 30 and then inserted in the first slot 36 and then pulled through the vertical slot 39 so as to properly hold and position the plumb bob device of the present invention in proper position for use.

Reference is now directed to FIG. 2 of the drawings wherein a tripod illustrated at 50 is shown. The tripod 50 is adapted to carry at its upper end a surveying instrument partially illustrated and represented by the numeral 51, which may be, of course, any suitable device known in the art. The tripod 51 includes a plurality of legs, generally three (two of which are illustrated) which have their ends placed in or on the earth or other surface as illustrated at 52.

It will be noted that the device 15 of the present invention is illustrated in full line view at an uppermost position wherein it is spaced slightly beneath the instrument 51. The flexible line 26 is unwound a sufficient amount and then inserted in slots 36 and 39. This holds the container 16 in the position shown. Since the line 26 is axially extending from the slot 39 in shaft 35, the container 16 and plumb bob device are properly positioned. When the device is in the full line view as illustrated in FIG. 2 of the drawings, it can be appreciated that sufficient flexible line 27 must be unwound from drum 18 which extends downwardly to the tethering weight 53 having a bench mark 54 thereon. Similarly, line 27 is engaged in slots 36 and 39 so that the container 16 retains its position, and such line extends coincident with the longitudinal axis of shaft 35.

While considering the invention as shown in the context of the tripod in FIG. 2, it will be noted that it is generally desired to obtain vertical alignment of the center of the tripod structure 50 with respect to the bench mark 54 or other marker whereby more rapid leveling of the tripod 50 is obtained and wherein operations can be pursued even during weather conditions which might otherwise customarily be restrictive of use of plumb bobs known in the art.

The invention 15 is illustrated in dotted line at positions 54 and 55 in different adjusted vertical positions relative to the full line view adjacent the upper end of the tripod 50 of FIG. 2. In some circumstances it may be desirable to position the plumb bob device at various vertical heights, and the construction and arrangement of the spools on the container 16 of the present invention accomplishes such function with a minimum of effort.

It can also be appreciated that since the plumb bob device is completely encased in liquid, movement thereof due to wind conditions or other weather conditions that might otherwise interfere are greatly reduced and allow the plumb bob device to come to rest more rapidly than otherwise possible. Also, since the cylindrical housing 16 carries a spool 17 and 18 at each end thereof, this provides a means of storage of flexible line along with the plumb bob device so that such flexible line is readily at hand and can be unwound and used when desired. Quiet often, lines used with plumb bob devices become lost, become covered with mud, grease or other substances which might interfere with or delay the use of the plumb bob. Since the flexible lines can be stored on the drums 17 and 18, this problem is reduced.

The device of the present invention is adapted to be used during weather conditions when conventional plumb bob devices are unavailing. For instance, during a windy day, the flexible string usually used with conventional plumb bob devices is sufficiently long to catch wind and to cause continual fluctuation of the plumb bob. The device of the present invention is essentially immune to windy conditions since it is tethered at each end and it is encased in liquid. However, it will be appreciated that tethering of the device as above noted does not interfere with the operation of the plumb bob device and it still may be employed to obtain the desired vertical.

The use of the present invention is well known to those skilled in the art. My copending application Ser. No. 85,095 hereinbefore referred to may be referred to for other examples illustrating use.

The present invention provides a structure which is adapted to be used in sight lines, surveying instruments, building construction, and the like. To avoid overextending the examples of operation of the present invention, the foregoing should be sufficient to instruct one skilled in the art in the operation of the present invention and to enable the user to obtain the new results provided herein.

The foregoing disclosure and description of the invention are illustrative and explanatory thereof, and various changes in the size, shape, and materials as well as in the details of the illustrated construction may be made without departing from the spirit of the invention.

What is claimed is:

1. An alignment device comprising:
   a. a plumb bob member;
   b. a transparent, closed container surrounding said plumb bob member;
   c. flexible means for suspending said plumb bob member from one end of said container to hang within said container;
   d. a dampening liquid in said container in which said plumb bob is immersed for dampening movement thereof;
   e. upwardly pointed indicator means centrally positioned within said closed container at the other end thereof for alignment with said plumb bob to indicate a true vertical relationship of said plumb bob member;
   f. spool means on said container adjacent one end thereof;
   g. flexible means wound on said spool for unwinding therefrom and suspending said container from a fixed position;
   h. additional spool means on said container adjacent the other end thereof, and
   i. flexible means wound on said additional spool for unwinding therefrom and securing said container in tethered position to inhibit movement thereof in a wind.

2. The invention of claim 1 wherein each of said spool means include:
   a. spaced inner and outer flanges;
   b. a drum extending therebetween;
   c. an axial shaft projecting outwardly from each of said outer flanges;

d. a first slot between the end of each of said shafts and said outermost flanges, said first slot extending approximately half-way through said shaft and at a right angle to the longitudinal axis of said shaft; and e. a second slot in each of said shafts extending from one end of each of said first slots axially of and to the center of the end of said shafts whereby the flexible line after being unwound from said spools may be secured in said first and second slots to extend axially from said container.

* * * * *